(12) United States Patent
Ong et al.

(10) Patent No.: US 7,454,630 B1
(45) Date of Patent: Nov. 18, 2008

(54) SYSTEM AND METHOD FOR INTERCONNECTING DOWNSTREAM USB PORTS USING LIMITED POWER DURING UNCONFIGURED STATE

(75) Inventors: Ann Tiong Ong, Singapore (SG); Xun Zhang Wang, Singapore (SG); James Jianyun Zhou, Singapore (SG)

(73) Assignee: Adaptec, Inc., Milpitas, CA (US)

( * ) Notice: Subject to any disclaimer, the term of this patent is extended or adjusted under 35 U.S.C. 154(b) by 878 days.

(21) Appl. No.: 10/839,931

(22) Filed: May 5, 2004

Related U.S. Application Data

(60) Provisional application No. 60/493,644, filed on Aug. 8, 2003.

(51) Int. Cl.
*G06F 1/00* (2006.01)
*G06F 1/26* (2006.01)
(52) U.S. Cl. .................. 713/300; 713/310; 713/320
(58) Field of Classification Search ............. 713/300, 713/310, 320
See application file for complete search history.

(56) References Cited

U.S. PATENT DOCUMENTS

| | | | | |
|---|---|---|---|---|
| 5,675,813 A * | 10/1997 | Holmdahl | ............ | 713/310 |
| 6,253,329 B1 * | 6/2001 | Kang | ............ | 713/300 |
| 6,507,172 B2 * | 1/2003 | Sherman | ............ | 320/134 |
| 6,715,071 B2 * | 3/2004 | Ono et al. | ............ | 713/100 |
| 6,810,481 B1 * | 10/2004 | Kawade et al. | ............ | 713/300 |
| 7,340,627 B1 * | 3/2008 | Harvey | ............ | 713/330 |
| 2004/0063464 A1 * | 4/2004 | Akram et al. | ............ | 455/559 |

\* cited by examiner

*Primary Examiner*—Suresh K Suryawanshi
(74) *Attorney, Agent, or Firm*—Martine Penilla & Gencarella LLP

(57) ABSTRACT

An invention is provided for limiting power during an unconfigured state of a USB device. The invention includes a first voltage regulator, which supplies a first voltage, in electrical communication with internal device logic of a USB device. A second voltage regulator is also included that supplies a second voltage that is higher than the first voltage. In addition, a current limiting resistor is included. The current limiting resistor is coupled to an output of the second voltage regulator and is further in electrical communication with the internal device logic of the USB device. The current limiting resistor is configured to allow a maximum current of 100 mA from being provided to the internal device logic of a USB device from the second voltage regulator.

19 Claims, 4 Drawing Sheets

SYSTEM AND METHOD FOR INTERCONNECTING DOWNSTREAM USB PORTS USING LIMITED POWER DURING UNCONFIGURED STATE

CROSS REFERENCE TO RELATED APPLICATIONS

This application claims the benefit of U.S. Provisional Patent Application having Application No. 60/493,644, filed on Aug. 8, 2003, entitled "System and Method for Interconnecting Downstream USB Ports Using Limited Power During Unconfigured State", which is hereby incorporated by reference.

BACKGROUND OF THE INVENTION

1. Field of the Invention

This invention relates generally to universal serial bus utilization, and more particularly to low power universal serial bus utilization during the unconfigured state of a USB-to-USB device.

2. Description of the Related Art

In recent years, the universal serial bus (USB) has come into being as an interface for easily connecting a plurality of peripheral devices to a personal computer. Consequently, peripheral devices having a port for USB (hereinafter referred to as a USB port) have become increasingly available.

Prior to USB, in order to connect a keyboard, printer, monitor, modem or mouse to the personal computer, it was often necessary to use several different types of local electrical buses and associated ports, such as a serial port for a modem, a parallel port for the printer, a keyboard port and a mouse port. This leads to unnecessary complexity since each peripheral device may use a different bus. Therefore, USB was created to provide a standard interconnect for peripherals, and to facilitate connecting peripheral devices to the computer. USB not only replaces the multiple cables and physical connectors typically needed with a single standardized connection system, it provides a standard electrical specification.

USB also permits peripheral devices to be connected and/or disconnected from the bus while the computer system is powered up which eliminates the need, with conventional buses, to power down and "re-boot" every time that a peripheral device is connected or disconnected. In addition, USB permits a peripheral connected to the USB to be detected and a configuration process for the device, known as enumeration, may be commenced.

The employment of USB enables the use of common interfaces for mice, keyboards, printers, modems, speakers, joy sticks, etc. Further, equipping a personal computer with a single USB port enables up to 127 peripheral devices to be connected to each other using a USB hub apparatus.

USB supports two types of power sourcing capabilities: low-power ports and high-power ports. Low-power ports are capable of delivering a maximum current of 100 mA to a USB device, while high-power ports are capable of delivering a maximum current of 500 mA to a USB device. USB also supports two types of bus-powered devices: low-power bus-powered devices and high-power bus-powered devices. Low-power bus-powered devices are capable of drawing a maximum current of 100 mA from a USB bus, while high-power bus-powered devices are capable of drawing a maximum current of 500 mA from a USB bus.

Also supported in the USB specification are self-powered devices. Self-powered devices are capable of drawing a maximum current of 100 mA from a USB bus to allow the USB to function when the rest of the device is powered down. All other power requirements for the device are provided from external power sources.

As mentioned above, USB is designed to support "Plug-and-play," which provides ability to add new USB components and have them work without needing to perform any technical analysis or procedure on the USB component. As a result, it is common for USB devices to be interchanged regularly. As will be appreciated by those skilled in the art, connecting a high-power bus-powered device to a low-power port can cause compatibility problems since the device will require 500 mA from the low-power port, which can only supply 100 mA.

To address this issue, the USB specification requires USB devices to draw a current of less than 100 mA per connecting USB port during an unconfigured state. If the device requires a higher current for full functionality, such as a high-power bus-powered device, the device negotiates for higher current by reporting its current requirements through device descriptors.

USB-to-USB devices have two USB upstream ports, each of which is connected to a USB downstream port of a host computer. In this manner, two host computers can communicate with each other using the USB-to-USB device. This USB-to-USB connection allows the host computers to share resources such as hard drives, CD-ROMs, printers, and network access.

In a USB-to-USB device, since two USB ports are connected to the same device, the current drawing from both USB ports during the unconfigured state can total up to 200 mA. Unfortunately, prior art USB devices often are not designed to limit power from multiple USB ports during the unconfigured state of a device.

In view of the foregoing, there is a need for systems and methods that limit current drawn from each port of a multi-port USB device. The systems and methods should limit current drawn from each port to a maximum of 100 MA per port.

SUMMARY OF THE INVENTION

Broadly speaking, the present invention fills these needs by providing a technique for interconnecting downstream USB ports using limited power during an unconfigured state. In one embodiment, an unconfigured state power limiter circuit for use in a USB device is disclosed. The unconfigured state power limiter circuit includes a first voltage regulator, which supplies a first voltage and is in electrical communication with internal device logic of a USB device. A second voltage regulator also is included that supplies a second voltage that is higher than the first voltage. In addition, a current limiting resistor is included. The current limiting resistor is coupled to the output of the second voltage regulator and is further in electrical communication with the internal device logic of the USB device. The current limiting resistor is configured to allow a maximum current of 100 mA from being provided to the internal device logic of a USB device from the second voltage regulator. In one aspect, the current limiting resistor can provide a potential difference equal to a voltage difference between the second voltage and the first voltage when 100 mA is provided from the second voltage regulator.

A method for limiting power supplied to a USB device in an unconfigured state is disclosed in an additional embodiment of the present invention. The method includes providing a first voltage regulator that supplies a first voltage. As above, the first voltage regulator is in electrical communication with internal device logic of a USB device. A second voltage regulator also is provided that supplies a second voltage that is higher than the first voltage. Further, a current from the second voltage regulator to the internal device logic of the USB device is limited to a maximum current of 100 mA. As above, the current provided to the internal device logic of the USB device from the second voltage regulator can be limited using a current limiting resistor that is coupled to the output of the second voltage regulator and also in electrical communication with the internal device logic of the USB device. In one aspect, a voltage regulator is disabled if a USB voltage is absent at a USB voltage input of either the first voltage regulator or the second voltage regulator.

A USB-to-USB device having unconfigured state power limitation functionality is disclosed in a further embodiment of the present invention. The USB-to-USB device includes a first USB interface in electrical communication with a first USB port, and a second USB interface in electrical communication with a second USB port. Further included in the USB-to-USB device is an unconfigured state power limiter circuit, which is in electrical communication with both the first USB interface and the second USB interface. The unconfigured state power limiter circuit limits current drawn from the second USB port to no more than 100 mA during an unconfigured state. Internal device logic capable of providing device functionality also is included in the USB-to-USB device.

In one aspect, the unconfigured state power limiter circuit can include a first voltage regulator supplying a first voltage and in electrical communication with the internal device logic, and a second voltage regulator supplying a second voltage that is higher than the first voltage. As above, the unconfigured state power limiter circuit can further include a current limiting resistor coupled to an output of the second voltage regulator and in electrical communication with the internal device logic. The current limiting resistor is configured to allow a maximum current of 100 mA from being provided to the internal device logic from the second voltage regulator. In addition, the unconfigured state power limiter circuit can be configured to stop all current from being drawn from any USB port if any USB port is unconnected the USB-to-USB device.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for interconnecting downstream USB ports using limited power during an unconfigured state. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
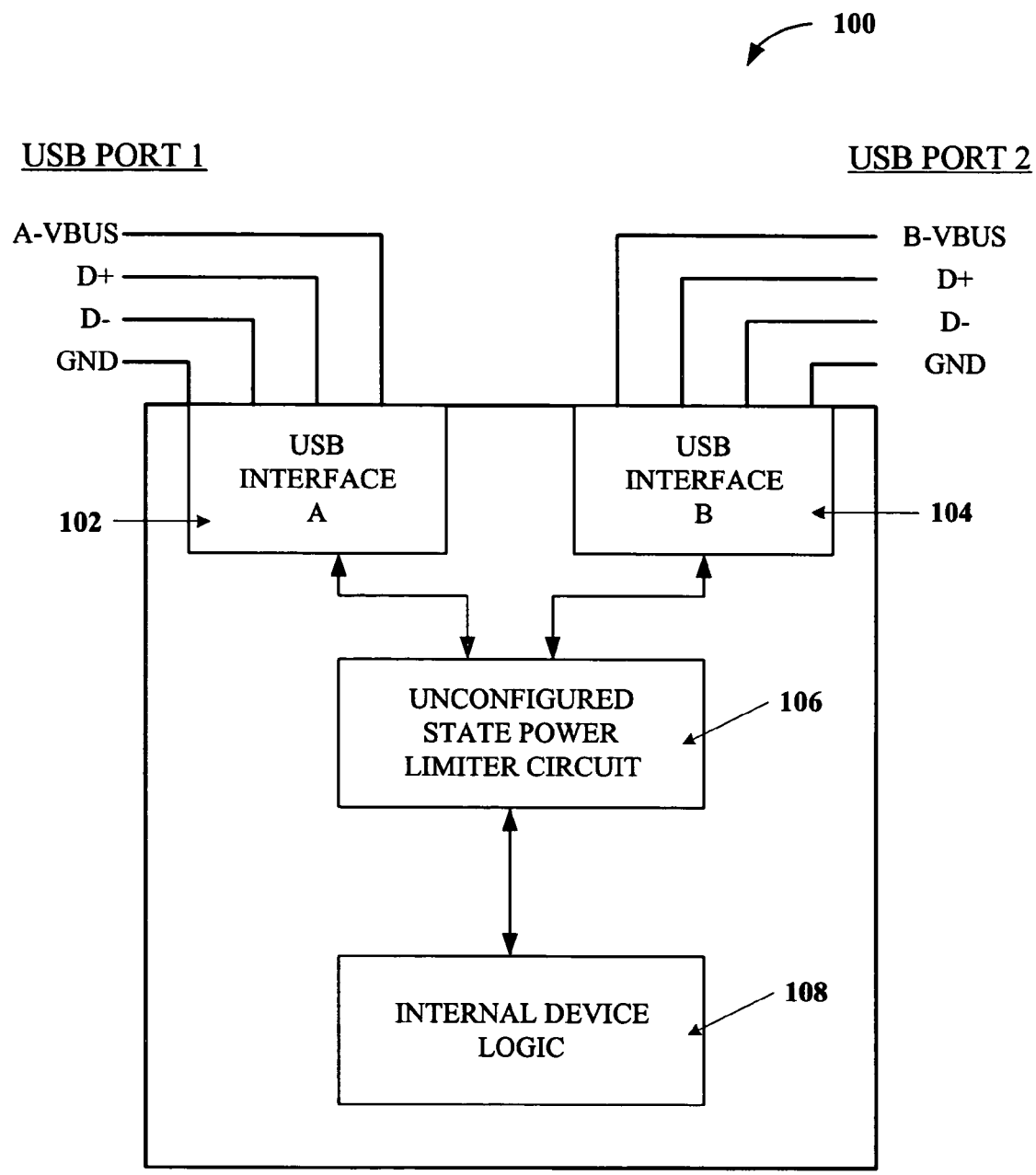
FIG. 1 is a block diagram showing a USB-to-USB device having unconfigured state power limitation functionality, in accordance with an embodiment of the present invention.

FIG. 1 is a block diagram showing a USB-to-USB device 100 having unconfigured state power limitation functionality, in accordance with an embodiment of the present invention. The USB-to-USB device 100 can be utilized to connect two separate universal serial buses via USB port 1 and USB port 2, allowing data from one bus to be passed onto the other bus and vice-versa. For example, two personal computer systems (not shown) can be connected to and communicate with each other by connecting the USB ports of the personal computer systems to each other.

As shown in FIG. 1, the USB-to-USB device 100 includes a USB interface circuit A 102, which is connected to USB port 1, and a USB interface circuit B 104, which is connected to USB port 2. The interface circuits 102 and 104, as defined by the USB specification, receive the incoming USB data and synchronize a local clock to the incoming USB data so that the data can be decoded. In addition, the interface circuits 102 and 104 can be connected to each other using decoders (not shown), which decode the USB data based on the local clock so that data may pass between the two USBs to communicate the data. In this manner, USB can be used to communicate data between computers as well as to connect peripheral devices.

Each USB port on the host computers includes a plurality of signal lines. In particular, each USB port includes a power signal line (A_VBUS or B_VBUS) that provides 5 volts, a ground signal line (GND), a positive data signal line (D+) and a negative data signal line (D−). The positive data signal line D+ and the negative data signal D− both transmit a signal having a voltage between 0 and 3.3 volts, and are capable of communicating data and command signals over the USB. The power signal lines A_VBUS and B_VBUS provide power to the peripheral devices connected to the USB. In the example of FIG. 1, the USB-to-USB device 100 receives the current necessary to power the circuits in the USB-to-USB device 100 from the power signals lines A_VBUS and B_VBUS of either of the USB ports as described in greater detail below.

Therefore, it is necessary to ensure that the USB-to-USB device 100 does not draw more than the maximum unconfigured current of 100 MA per USB port during an unconfigured state. To accomplish this, the USB-to-USB device 100 includes an unconfigured state power limiter circuit 106, which ensures that the USB-to-USB device 100 meets the maximum unconfigured current requirement.

The unconfigured state power limiter circuit 106 determines how to supply power to the internal device logic 108 of the USB-to-USB device 100 without exceeding the maximum unconfigured current limit when the USB-to-USB device 100 is in an unconfigured state. Specifically, the unconfigured state power limiter circuit 106 limits the current drawn from one of the USB ports to no more than 100 mA during an unconfigured state. In addition, to avoid drawing more than 100 mA of current from a single USB port when only one USB is connected, the unconfigured state power limiter circuit 106 stops all current from being drawn from any USB port if any USB port is unconnected, as illustrated next with reference to FIG. 2.

Figure 2:
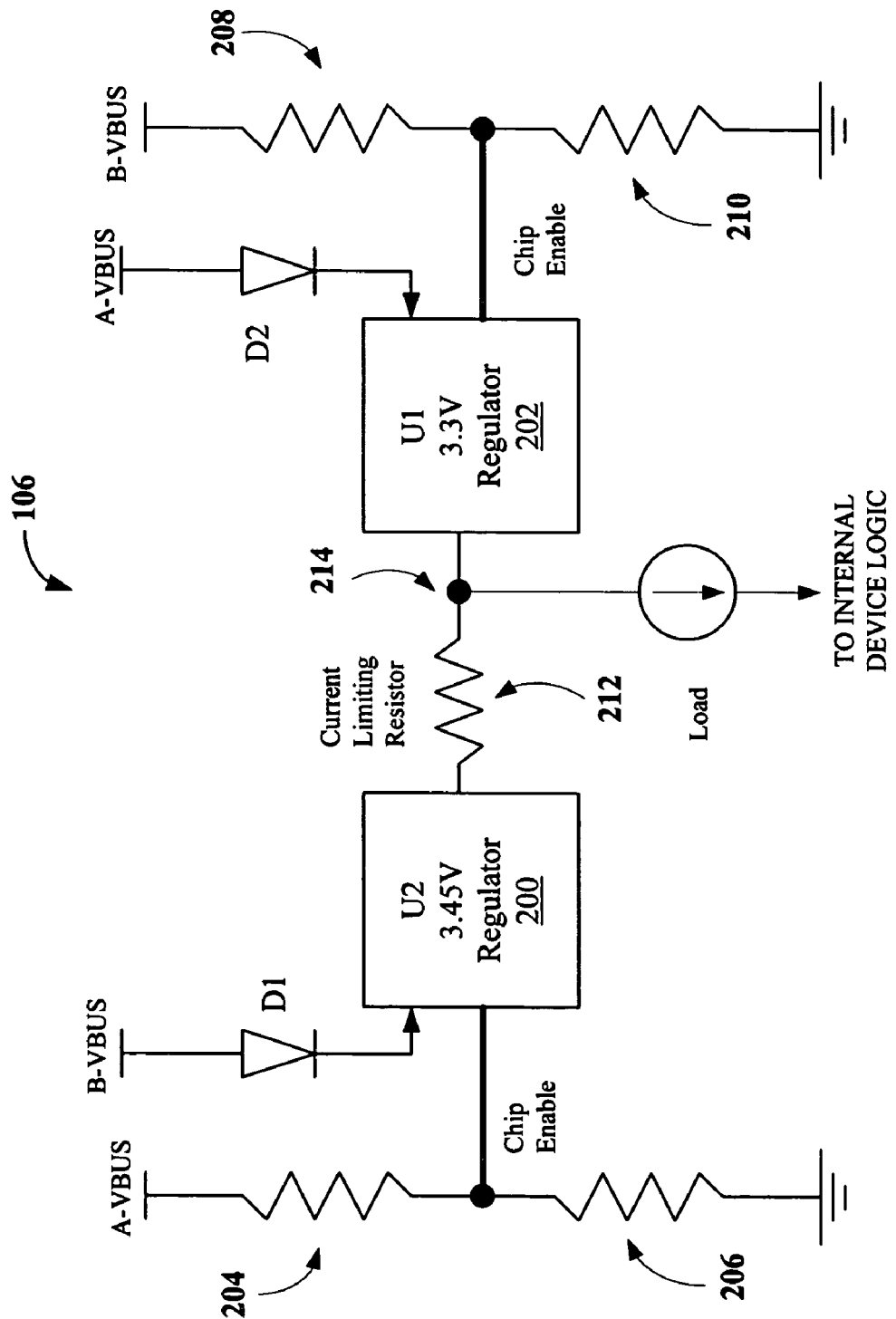
FIG. 2 is a schematic diagram showing an unconfigured state power limiter circuit, in accordance with an embodiment of the present invention.

FIG. 2 is a schematic diagram showing an unconfigured state power limiter circuit 106, in accordance with an embodiment of the present invention. The unconfigured state power limiter circuit 106 includes a high voltage regulator 200 and a low voltage regulator 202. In operation, the high voltage regulator 200 supplies a higher voltage than the low voltage regulator 202. As will be apparent to those skilled in the art, a voltage regulator is a device that maintains a level amount of voltage in an electrical line. The voltage regulators 200 and 202 regulate the voltage fed to the internal device logic device of the USB-to-USB device. The power supplied from power signal lines A_VBUS and B_VBUS is 5 volts, however, the internal device logic may require a voltage below 3.5 volts. The voltage regulators reduce the 5 volt signal to the lower voltage required by the internal device logic. In one embodiment, the voltage regulators 200 and 202 can be surrounded by heat sinks to reduce heat.

Coupled to the input of the high voltage regulator 200 is the B_VBUS power signal line of USB port 2, and coupled to the input of the low voltage regulator 202 is the A_VBUS power signal line of USB port 1. Each voltage regulator 200 and 202 also includes a chip enable input. The chip enable input of the high voltage regulator 200 is coupled to the A_VBUS power signal line of USB port 1 via a voltage divider comprised on resistors 204 and 206. Similarly, the chip enable input of the low voltage regulator 202 is coupled to the B_VBUS power signal line of USB port 2 via a voltage divider comprised on resistors 208 and 210.

Embodiments of the present invention ensure that the USB-to-USB device meets the maximum unconfigured current requirement by utilizing voltage regulators 200 and 202 having two different voltages, as described above, and a current limiting resistor 212, which is coupled to the high voltage regulator 200. The current limiting resistor 212 is configured to provide a potential difference equal to the voltage difference between the two voltage regulators 200 and 202 when 100 mA or lower is drawn from the high voltage regulator 200, as illustrated in FIG. 3.

The current drawn from the node 214 would vary, depending on the current required by the device logic. However, the total current required by the internal logic may be limited to about 200 mA or less. As described above, the current drawn from high voltage regulator 200 is fixed, due to the fixed voltage difference between the output of voltage regulators 200 and 202 and the fixed resistance of the current limiting resistor 212. Whereas, the amount of current drawn from voltage regulator 202 varies. The amount of current drawn from the voltage regulator 202 depends on the current required by the internal device logic. As such, the current drawn from the voltage regulator 202 is the total current required by the internal device logic minus the current contributed by the voltage regulator 200.

Figure 3:
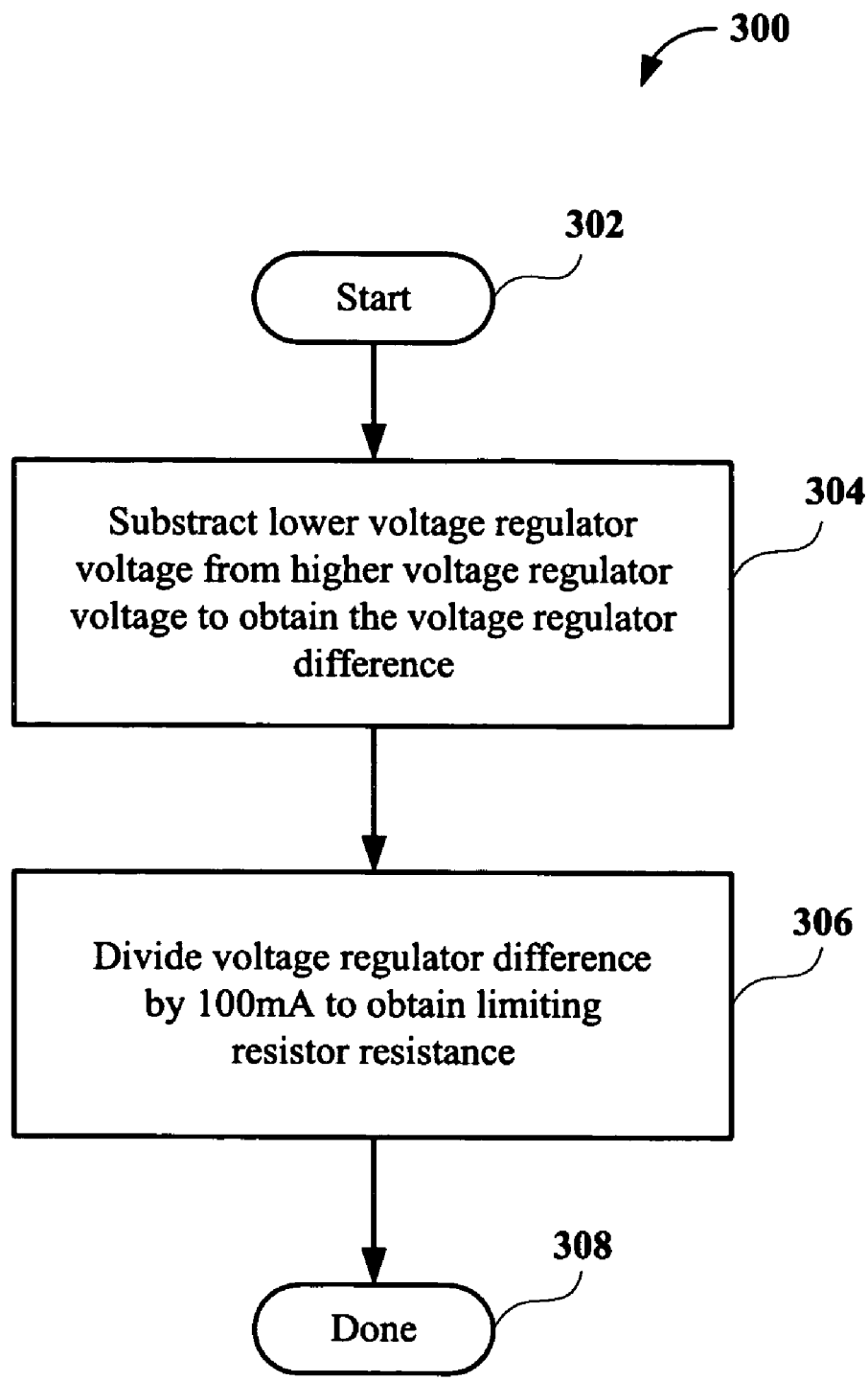
FIG. 3 is a flowchart showing a method for calculating the resistance of the current limiting resistor, in accordance with an embodiment of the present invention.

FIG. 3 is a flowchart showing a method 300 for calculating the resistance of the current limiting resistor 212, in accordance with an embodiment of the present invention. In a preprocess operation 302, preprocess operations are performed. Preprocess operations can include, for example, selecting voltage regulators capable of supplying appropriate power levels to the internal device logic of the USB-to-USB device, configuring the USB-to-USB device, and other preprocess operations that will be apparent to those skilled in the art after a careful reading of the present disclosure.

In operation 304, the lower voltage regulator voltage is subtracted from the higher voltage regulator voltage to obtain the voltage regulator difference. The voltage regulator difference is the potential difference between the high voltage regulator and the low voltage regulator. Although embodiments of the present invention can be utilized in conjunction with voltage regulators supplying any values, a preferred embodiment of the present invention includes voltage regulators supplying two different voltage values.

Next, in operation 306, the voltage regulator difference is divided by 100 mA to obtain the limiting resistor resistance. As stated previously, the current limiting resistor is configured to provide a potential difference equal to the voltage difference between the two voltage regulators when 100 mA or lower is drawn from the high voltage regulator. Thus, the voltage regulator difference is divided by 100 mA, which is the maximum current to be drawn from the high voltage regulator, to obtain the resistance of the limiting resistor. In this manner, the high voltage regulator will provide at most 100 mA to the internal device logic when the USB-to-USB device is in the unconfigured state.

Post process operations are performed in operation 308. Post process operations can include coupling the current limiting resistor to the high voltage regulator, connecting the USB-to-USB device to two USB ports, and other post process operations that will be apparent to those skilled in the art. In this manner, the current limiting resistor allows a maximum current of 100 mA to be drawn from the high voltage regulator by providing a potential difference equal to the voltage difference between the two voltage regulators when 100 mA or lower is drawn from the high voltage regulator.

Referring back to the example of FIG. 2, the voltage output of the two voltage regulators is:

Voltage output of high voltage regulator 200=3.45V

Voltage output of low voltage regulator 202=3.3V

Thus, the resistance of the current limiting resistor 212 in the example of FIG. 2 is:

$$\text{Minimum resistance of}$$
$$\text{current limiting resistor } 212 = (3.45 \text{ V} - 3.3 \text{ V})/100 \text{ mA}$$
$$= 1.5 \text{ ohms}$$

In one embodiment, the low voltage regulator 202 is utilized as the main voltage regulator, which holds and regulates the voltage supply to the internal device logic. The current drawn from node 214 can vary, depending on the operation of the internal device logic of the USB-to-USB device. However, the current drawn from the output of the high voltage regulator 200 does not exceed 100 mA because of the current limiting resistor 212. One skilled in the art would appreciate that the current drawn from the low voltage regulator 202 is also limited to about 100 mA or less during the unconfigured state as the internal device logic is limited to a total of 200 mA or less during the unconfigured state.

To avoid drawing more than 100 mA of current from a single USB port when only one USB is ready to supply power, both USB ports should apply power to the USB-to-USB simultaneously. Thus, embodiments of the present invention utilize a chip enable on each voltage regulator 200 and 202. As described above, each voltage regulator 200 and 202 includes a chip enable input. Resistors 204, 206, 208, and 210 form an inter-locking mechanism that ensures that the USB ports' 5 volt power is provided to the USB-to-USB device only when both USB ports are connected to the voltage regulators 200 and 202.

The chip enable input of the high voltage regulator 200 is coupled to the A_VBUS power signal line of USB port 1 via a voltage divider comprising resistors 204 and 206. As will be appreciated by those skilled in the art, the voltage divider comprising resistors 204 and 206 provides the chip enable input of the high voltage regulator 200 with a voltage lower than the 5 Volts provided by the A_VBUS. In a similar manner, the chip enable input of the low voltage regulator 202 is coupled to the B_VBUS power signal line of USB port 2 via a voltage divider comprising resistors 208 and 210. As above, the voltage divider comprising resistors 208 and 210 provides the chip enable input of the low voltage regulator 202 with a voltage lower than the 5 Volts provided by the B_VBUS. In this manner, both voltage regulators 200 and 202 will operate only when both USB ports' 5 Volts is present at the voltage regulators 200 and 202.

When the USB-to-USB device is powered and in normal operation, removal of one of the USB port voltages will automatically break the inter-locking mechanism formed by resistors 204, 206, 208, and 210 and disable the voltage regulators, due to an absence of chip enable voltage. However, particular voltage regulators can experience a reverse current when the output voltage of the voltage regulator is higher than input voltage of the voltage regulator. This reverse current can continue to support the chip enable voltage of the connected USB port, preventing the power supply to the USB-to-USB device from being terminated. To address this problem, embodiments of the present invention can utilize voltage regulators that have a reverse current prevention feature. Optionally, low reverse current Diodes (or Schottky Diodes) D1 and D2 can be placed in line with the input of each voltage regulator, as illustrated in FIG. 2.

Figure 4:
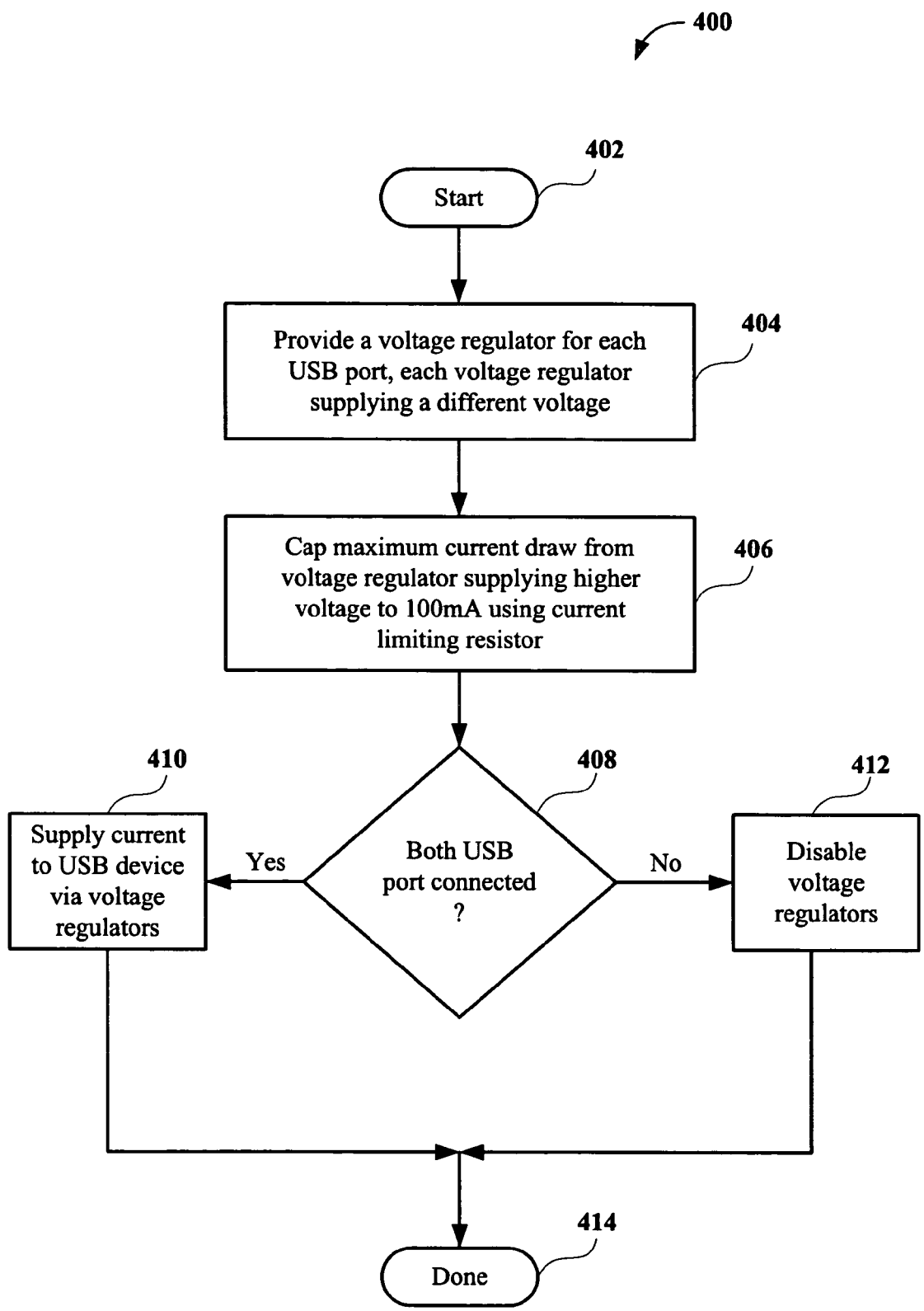
FIG. 4 is a flowchart showing a method for limiting power draw in a USB-to-USB device in an unconfigured state, in accordance with an embodiment of the present invention.

FIG. 4 is a flowchart showing a method 400 for limiting power draw in a USB-to-USB device in an unconfigured state, in accordance with an embodiment of the present invention. In operation 402, preprocess operations are performed. Preprocess operations can include, for example, configuring the USB-to-USB device, and other preprocess operations that will be apparent to those skilled in the art after a careful reading of the present disclosure.

In operation 404, a voltage regulator is provided for each USB port. Preferably, each voltage regulator supplies a different voltage. In one embodiment, as mentioned above, a high voltage regulator and a low voltage regulator can be provided. The high voltage regulator supplies a higher voltage than the low voltage regulator. The voltage regulators regulate the voltage fed to the internal device logic device of the USB-to-USB device. Coupled to the input of the each voltage regulator is the power signal line of related USB port. As described previously, the power supplied from the power signal lines of the USB ports is 5 volts, however, the internal device logic may require a voltage below 3.5 volts. The voltage regulators reduce the 5 volt signal to the lower voltage required by the internal device logic.

In operation 406, the maximum current draw from the voltage regulator supplying the higher voltage is capped to 100 mA using a current limiting resistor. Embodiments of the present invention ensure that the USB-to-USB device meets the maximum unconfigured current requirement by utilizing voltage regulators having two different voltages, as described above, and a current limiting resistor, which is coupled to the high voltage regulator. The current limiting resistor is configured to provide a potential difference equal to the voltage difference between the two voltage regulators when 100 mA or lower is drawn from the high voltage regulator.

During normal operation, the voltage regulator supplying the lower voltage is utilized as the main voltage regulator, which holds and regulates the voltage supply to the internal device logic. As mentioned above, the current drawn from this voltage regulator can vary, depending on the operation of the internal device logic of the USB-to-USB device. However, the current drawn from the output of the high voltage regulator will not exceed 100 mA because of the current limiting resistor.

A decision is then made as to whether both USB ports are connected to the USB-to-USB device, in operation 408. To avoid drawing more than 100 mA of current from a single USB port when only one USB is ready to supply power, both USB ports should apply power to the USB-to-USB simultaneously. Thus, if both USB ports are connected to the USB-to-USB device, the method 400 continues to operation 410, where current is supplied to the USB-to-USB device using the voltage regulators. However, if both USB ports are not connected to the USB-to-USB device, the method 400 branches to operation 412.

In operation 412, the voltage regulators are disabled. Embodiments of the present invention utilize a chip enable on each voltage regulator to avoid drawing more than 100 mA of current from a single USB port when only one USB is ready to supply power. As described above, each voltage regulator includes a chip enable input. Voltage dividers are used to form an inter-locking mechanism that ensures that the USB ports' 5 Volt power is provided to the USB-to-USB device only when both USB ports are connected to the voltage regulators.

The chip enable input of the high voltage regulator is coupled to the A_VBUS power signal line of USB port 1 via a voltage divider. In a similar manner, the chip enable input of the low voltage regulator is coupled to the B_VBUS power signal line of USB port 2 via a voltage divider. In this manner, both voltage regulators will operate only when both USB ports' 5 Volts is present at the voltage regulators.

When the USB-to-USB device is powered and in normal operation, removal of one of the USB port voltages will automatically break the inter-locking mechanism and disable the voltage regulators, due to an absence of chip enable voltage. However, as described above, particular voltage regulators can experience a reverse current when the output voltage of the voltage regulator is higher than input voltage of the voltage regulator. This reverse current can continue to support the chip enable voltage of the connected USB port, preventing the power supply to the USB-to-USB device from being terminated. To address this problem, embodiments of the present invention can utilize voltage regulators that have a reverse current prevention feature. Optionally, low reverse current Diodes (or Schottky Diodes) can be placed in line with the input of each voltage regulator.

The present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An unconfigured state power limiter circuit for use in a universal serial bus (USB) device, comprising:
   a first voltage regulator supplying a first voltage, the first voltage regulator being in electrical communication with internal device logic of a USB device;
   a second voltage regulator supplying a second voltage, the second voltage being higher than the first voltage; and
   a current limiting resistor coupled to an output of the second voltage regulator and in electrical communication with the internal device logic of the USB device, the current limiting resistor being configured to allow a maximum current of 100 mA from being provided to the internal device logic of a USB device from the second voltage regulator.

2. An unconfigured state power limiter circuit as recited in claim 1, wherein the current limiting resistor provides a potential difference equal to a voltage difference between the second voltage and the first voltage when 100 mA is provided from the second voltage regulator.

3. An unconfigured state power limiter circuit as recited in claim 2, wherein the current limiting resistor has a resistance equal to the voltage difference divided by 100 mA.

4. An unconfigured state power limiter circuit as recited in claim 1, wherein the first voltage regulator and the second voltage regulator operate only when a USB voltage is supplied at a USB voltage input of both the first voltage regulator and the second voltage regulator.

5. An unconfigured state power limiter circuit as recited in claim 4, wherein the first voltage regulator and the second voltage regulator both have chip enable inputs, wherein the first voltage regulator and the second voltage regulator do not operate when a voltage is absent from the chip enable inputs.

6. An unconfigured state power limiter circuit as recited in claim 5, wherein the chip enable input of the first voltage regulator is in electrical communication with a USB voltage input of the second voltage regulator.

7. An unconfigured state power limiter circuit as recited in claim 6, wherein the chip enable input of the second voltage regulator is in electrical communication with a USB voltage input of the first voltage regulator.

8. A method for limiting power supplied to a universal serial bus (USB) device in an unconfigured state, comprising the operations of:
   providing a first voltage regulator supplying a first voltage, the first voltage regulator being in electrical communication with internal device logic of a USB device;
   providing a second voltage regulator supplying a second voltage, the second voltage being higher than the first voltage; and
   limiting a current to the internal device logic of a USB device from the second voltage regulator to a maximum current of 100 mA.

9. A method as recited in claim 8, wherein the current provided to the internal device logic of a USB device from the second voltage regulator is limited using a current limiting resistor coupled to an output of the second voltage regulator and in electrical communication with the internal device logic of the USB device.

10. A method as recited in claim 9, wherein the current limiting resistor provides a potential difference equal to a voltage difference between the second voltage and the first voltage when 100 mA is provided from the second voltage regulator.

11. A method as recited in claim 10, wherein the current limiting resistor has a resistance equal to the voltage difference divided by 100 mA.

12. A method as recited in claim 8, further comprising the operation of disabling a voltage regulator if a USB voltage is absent at a USB voltage input of either the first voltage regulator or the second voltage regulator.

13. A method as recited in claim 12, wherein the first voltage regulator and the second voltage regulator both have chip enable inputs, wherein the first voltage regulator and the second voltage regulator do not operate when a voltage is absent from the chip enable inputs.

14. A method as recited in claim 13, wherein the chip enable input of the first voltage regulator is in electrical communication with a USB voltage input of the second voltage regulator, and wherein the chip enable input of the second voltage regulator is in electrical communication with a USB voltage input of the first voltage regulator.

15. A universal serial bus (USB)-to-USB device having unconfigured state power limitation functionality, comprising:
   a first USB interface in electrical communication with a first USB port;
   a second USB interface in electrical communication with a second USB port;
   an unconfigured state power limiter circuit in electrical communication with both the first USB interface and the second USB interface, the unconfigured state power limiter circuit limiting current drawn from the second USB port to no more than 100 mA during an unconfigured state; and
   internal device logic capable of providing device functionality.

16. A USB-to-USB device as recited in claim 15, wherein the unconfigured state power limiter circuit includes a first voltage regulator supplying a first voltage, the first voltage regulator being in electrical communication with internal device logic, and a second voltage regulator supplying a second voltage, the second voltage being higher than the first voltage.

17. A USB-to-USB device as recited in claim 16, wherein the unconfigured state power limiter circuit further includes a current limiting resistor coupled to an output of the second voltage regulator and in electrical communication with the internal device logic, the current limiting resistor being configured to allow a maximum current of 100 mA from being provided to the internal device logic from the second voltage regulator.

18. A USB-to-USB device as recited in claim 17, wherein the current limiting resistor provides a potential difference equal to a voltage difference between the second voltage and the first voltage when 100 mA is provided from the second voltage regulator.

19. A USB-to-USB device as recited in claim 18, wherein the unconfigured state power limiter circuit stops all current from being drawn from any USB port if any USB port is unconnected the USB-to-USB device.

* * * * *